US007222239B2

(12) United States Patent
Smith

(10) Patent No.: US 7,222,239 B2
(45) Date of Patent: May 22, 2007

(54) DYNAMIC SECURITY SYSTEM

(75) Inventor: Mark T. Smith, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 897 days.

(21) Appl. No.: 10/099,342

(22) Filed: Mar. 16, 2002

(65) Prior Publication Data

US 2003/0177370 A1 Sep. 18, 2003

(51) Int. Cl.
*H04L 9/00* (2006.01)

(52) U.S. Cl. ...................................... 713/185; 713/186

(58) Field of Classification Search ................. 713/185
See application file for complete search history.

(56) References Cited

U.S. PATENT DOCUMENTS 4,993,068 A * 2/1991 Piosenka et al. ............ 713/186
5,131,038 A * 7/1992 Puhl et al. ................. 340/5.61
5,245,329 A * 9/1993 Gokcebay .................. 340/5.33
5,796,827 A * 8/1998 Coppersmith et al. ...... 713/182
5,960,085 A * 9/1999 de la Huerga ............. 340/5.61
6,041,410 A * 3/2000 Hsu et al. ................... 713/186
6,346,886 B1 * 2/2002 De La Huerga ......... 340/573.1
6,431,455 B1 * 8/2002 Ponert ........................ 235/492

FOREIGN PATENT DOCUMENTS

| | | |
|---|---|---|
| EP | 0902401 | 3/1991 |
| FR | 2673743 | 9/1992 |
| WO | WO93/04425 | 3/1993 |
| WO | WO 5686 A1 * | 2/2000 |

* cited by examiner

*Primary Examiner*—Gilberto Barron, Jr.
*Assistant Examiner*—Kristin D. Sandoval

(57) ABSTRACT

A security system involving a user includes a token attachable to the user. The token is associated with the user while attached to the user. The association is automatically discontinued when the token is detached from the user.

20 Claims, 3 Drawing Sheets

DYNAMIC SECURITY SYSTEM

BACKGROUND

Security systems such as access control systems are used to control access to buildings and areas within buildings. The magnetic strip found on the back of a work badge may be used for access control. The work badge is scanned across a reader, which reads the information encoded in the magnetic strip, and sends that information to a computer. The computer consults a database to make an access decision. The access decision might be to unlock a door-locking mechanism.

This type of security system, and security systems in general, are not fool proof because security situations are dynamic. Security situations can change at any time granularity, location, or identity. For example, a work badge may be exchanged between individuals. The access control system might be able to authenticate access for a particular work badge, but it might not be able to verify that the work badge is actually possessed by the authorized person.

SUMMARY

According to one aspect of the present invention, a security system involving a user includes a token attachable to the user. The token is associated with the user while attached to the user. The association is automatically discontinued when the token is detached from the user.

Other aspects and advantages of the present invention will become apparent from the following detailed description, taken in conjunction with the accompanying drawings, illustrating by way of example the principles of the present invention.

DETAILED DESCRIPTION

Figure 1:
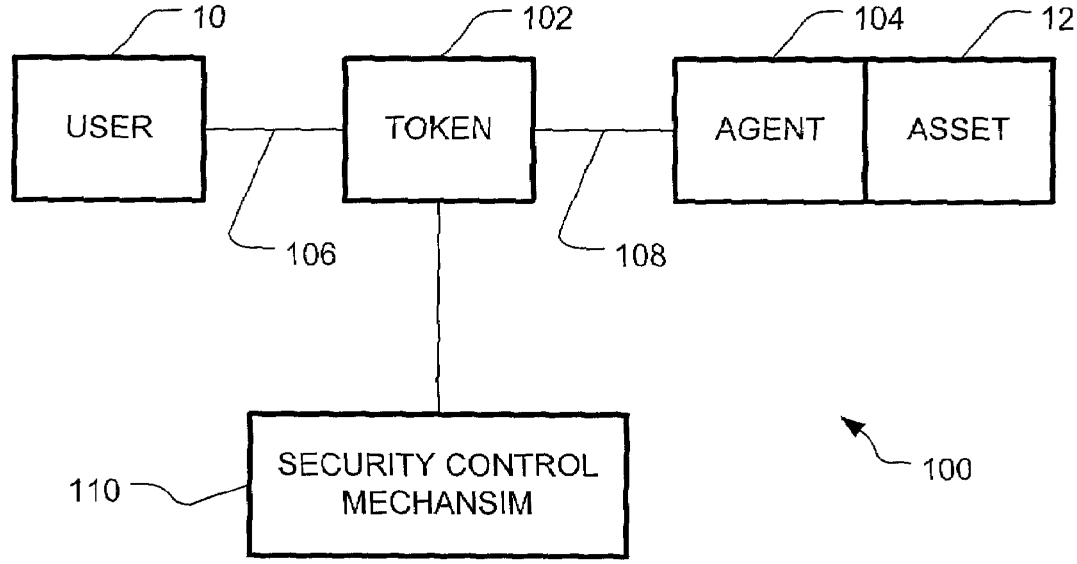
FIG. 1 is an illustration of a security system according to an embodiment of the present invention.

As shown in the drawings for the purpose of illustration, the present invention is embodied in a security system for controlling access to one or more "assets." Examples of assets include a location, a room, a car, an Internet appliance, a safe, a computer, etc.

Reference is made to FIG. 1, which shows a security system 100 for controlling a user's 10 access to an asset 12. The system 100 includes a token 102, which is attachable to the user 10. For example, the token 102 may be a watch that is worn on the wrist, a badge that is clipped onto an article of clothing, a box that is clipped onto a belt, etc. The token 102 includes a processor and data storage device for storing security information. The security information may include identification information about the user 10. The identification information might include the name of the person, a password, code, PIN, etc. The security information may include security parameters. The security parameters specify privileges and conditions upon which the user 10 may use the asset 12. Security parameters might specify a security clearance, a location, a time stamp, a maximum number of uses, etc. The token 102 would not be able to access the asset 12 after the time stamp (e.g., after midnight) or it would not be able to access the asset 12 more than the maximum number of times. The security parameters might specify the computer files that a person is allowed to access (e.g., a visitor is allowed to run application X, but not application Y), a requirement to be accompanied by another authorized party (e.g., a patient cannot enter a room unless accompanied by an attendant), etc.

The security parameters can also specify how security information is sent to the asset 12. For example, the security parameters might specify whether the security information should be sent encrypted.

The security parameters can specify conditions for which the security information is expunged from the token 102. The security information might be expunged if the token 102 detects a security violation, (e.g., the token 102 has been removed from a user 10) or if an attempt is made to physically alter the token 102.

The token 102 further includes a communication device (e.g., a transceiver) for sending and receiving the security information. The token 102 also includes a sensor for detecting when the token 102 is removed from the user 10.

A security control mechanism 110 is responsible for maintaining security information for different users, authenticating the identity of the user 10 to whom (or which) the token 102 is attached, and sending the security information to the attached token 102. There is no limitation on how the security control mechanism 110 performs its functions. The security control mechanism 110 may use a combination of humans and machines to perform its functions.

After the token 102 is attached to the user 10, the token 102 receives the security information, and stores the security information. At this point, an association is created between the token 102 and the user 10. This association may be regarded as a first leg 106 of a security path between the token 102 and the user 10. The first leg 106 of the security path stays intact as long as the token 102 remains attached to the user 10 and no other security violations are detected.

The system 100 may also include an agent 104 for the asset 12. If the asset 12 cannot communicate with the token 102, an agent 104 would be provided for the asset 12. As a first example, the token 102 might not be able to communicate with an asset 12 such as a building. However, the token 102 could communicate with an agent 104 such as a security gate, which controls access to the building. As a second example, the token 102 might not be able to communicate with an asset such as currency. However, the token 102 could communicate with an agent 104 such as a smart safe lock, which controls access to the currency.

If the asset 12 has processing capability and can communicate with the token 102, then an agent 104 might not be necessary. For example, an asset such as a computer or Internet appliance might not need an agent 104.

The asset 12 shown in FIG. 1 lacks the communication/processing capability. Therefore, an agent 104 is provided for it.

A second leg 108 of the security path is formed while the token 102 is communicating with the agent 104. The second leg 108 completes the security path.

The security path represents an association between the user 10, the token 102 and the agent 104/asset 12. Once any one of these elements breaks the association, the security path is broken and the user 10 is denied access to the asset 12.

When the token 102 detects that it has been removed from the user 10, the token processor expunges all of the security information from the token data storage, thus making the token 102 a "clean slate." Consequently, the first leg 106 of the security path is broken, and the user 10 is denied access to the asset 12. The first leg 106 is not re-established until the user 10 re-attaches the token 102 and receives the security information again.

The second leg 108 may be broken if the token 102 stops communicating with the agent 104. As a first example, the communication is stopped because the token 102 is outside the communication range of the agent 104. In this example, the second leg 108 can be reestablished when the token 12 is moved within communication range of the asset 12. As a second example, the token 102 stops communicating with the agent 104 because the first leg 106 has been broken.

While both security path legs 106 and 108 are established, a decision is made as to whether the user 10 should be denied or granted access to the asset 12. The decision may be made by the asset 12/agent 104, or by another entity. For example, the agent 104 receives a security code from the token 102, and decides to grant or deny access according to that security code. If the agent 104 does not have decision-making capability, it might send the security code to the security control mechanism 110, which makes the decision and instructs the agent 104 to deny or grant access.

Figure 2:
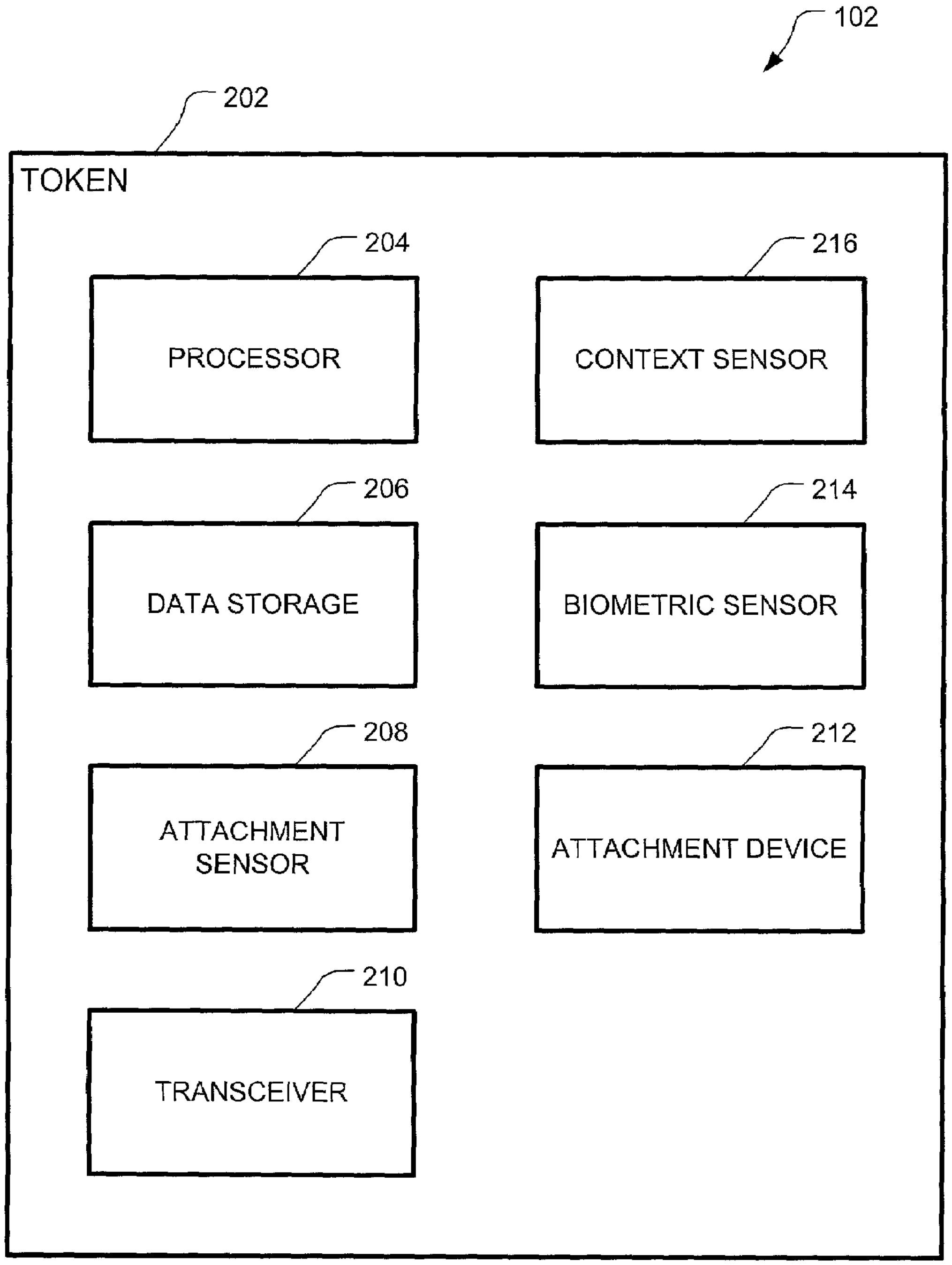
FIG. 2 is an illustration of a token for the security system.

Reference is now made to FIG. 2, which shows an exemplary token 102. The token 102 includes a body (e.g., a housing, a substrate) 202, and the following components attached to the body 202: a processor 204, data storage 206, an attachment sensor 208, a transceiver 210, and an attachment device 212. The type of attachment device 212 depends upon the type of user 10 to which the token 102 is attached. If the user 10 is a person, the attachment device 212 might be a clip, a wristband, or other device that attaches directly to the person or article of clothing.

The type of attachment sensor 208 depends upon how the token 102 is attached to the user 10. For example, a galvanic or heat sensor can be used to determine when a wristband is removed from a wrist, or a proximity sensor may be used to determine when a housing is unclipped from a belt.

The data storage 206 includes non-volatile and/or volatile memory (e.g., Flash memory, RAM) for storing the security information. The data storage 206 may include non-volatile memory (e.g., ROM) for storing a control program for the processor 204.

The program instructs the processor 204 to control the various functions performed by the token 102. These function include, but are not limited to, storing security information in the data storage 206, sending security information (to be transmitted) to the transceiver 210, receiving data from the transceiver 210, encrypting and decrypting information for secure transmission, analyzing sensor data to determine when the token 102 has been removed from the user 10, and expunging the security information from data storage 206 when token removal has been detected.

The transceiver 210 may also be used to transmit a tracking signal. The tracking signal could be used (by examining signal strength, time of flight) to determine the location of the token 102 and the user 10. In the alternative or in addition, the token 102 may include a tracking device such as an IR beacon or a GPS device.

The token 102 may also include a biometric sensor 214 for capturing biometric information about the user 10. The biometric information may be transmitted by the transceiver 210 to the security control mechanism 110, thus providing information that would help the security control mechanism 110 authenticate the user 10.

The data storage 206 could be programmed with a database containing security information, the same type of security information used by the security control mechanism

110. For example, the database might include the identities and privileges for a group of people. Interaction with the security control mechanism 110 can be eliminated or reduced if the token 102 is equipped with the biometric sensor 214 and programmed the security information.

The token 102 may include one or more context sensors 216 for obtaining information about the (context) environment surrounding the token 102 and the user 10. Such context might include motion, trajectory, animate surroundings, and inanimate surroundings. Exemplary context sensors 216 include accelerometers, humidity and temperature sensors, and video sensors. The token 102, agent 104 or security control mechanism 110 may use the context information to determine whether the user 10 and the asset 12 are in an authorized or hostile environment, how the asset 12 is being used, etc. For example, if the token 102 is in a hostile environment, the token 102 could decide to expunge all security information from its data storage 206 and thereby break the first leg 106 of the security path. The additional information provided by the context sensors 216 can increase the accuracy of the security decisions.

Figure 3:
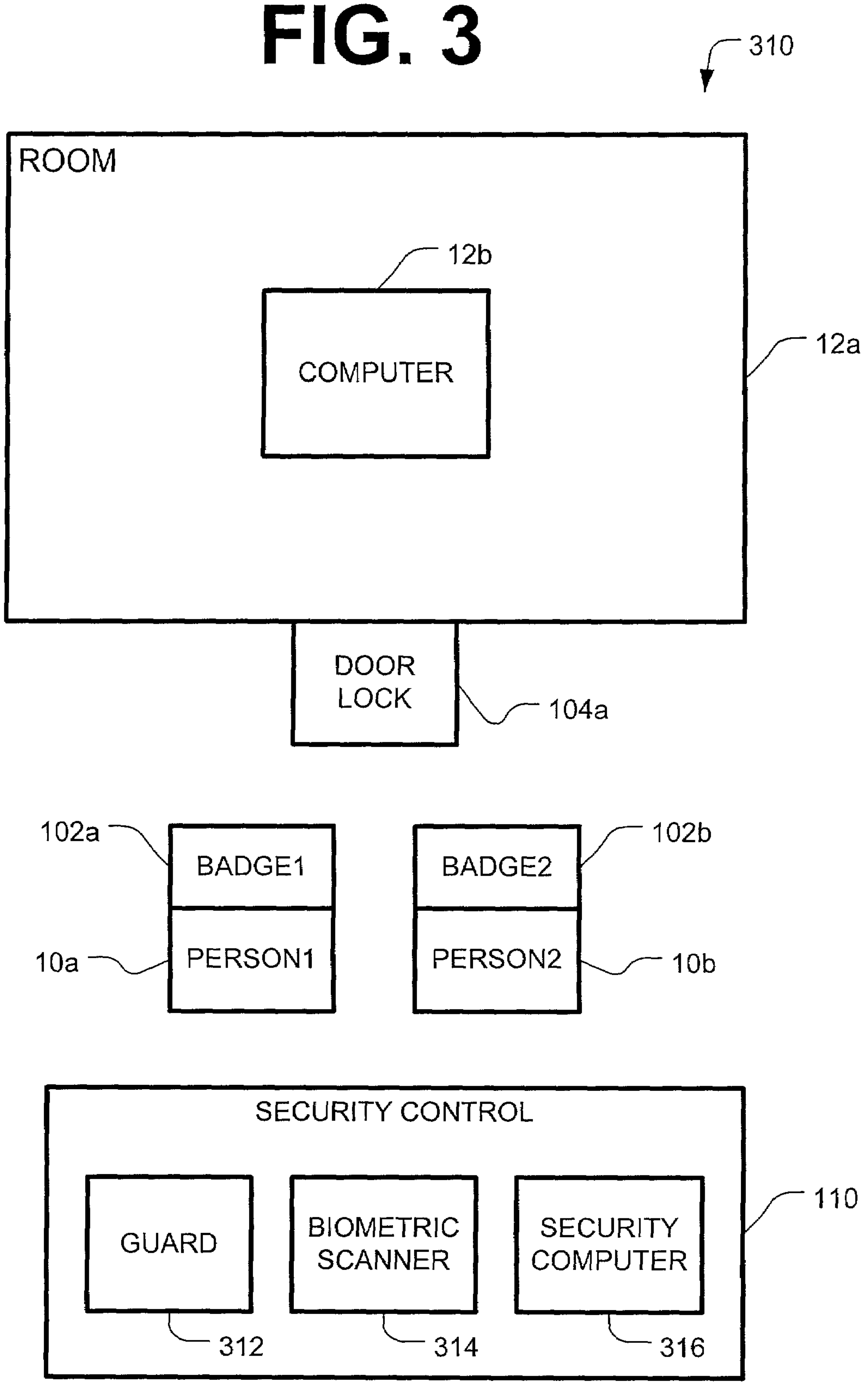
FIG. 3 is another illustration of a security system according to an embodiment of the present invention.

Reference is now made to FIG. 3. An exemplary security system 310 will now be described in connection with first and second people (users) 10*a* and 10*b* attempting to gain access to different assets. The assets include a room 12*a* and a secure computer 12*b* within the room 12*a*. The secure computer 12*b* is not provided with an agent. An agent 104*a* in the form of a smart door lock is provided for the room 12*a*. The tokens are security badges 102*a* and 102*b*. The security control mechanism 110 includes a security guard 312, a biometric scanner 314, and a security control computer 316.

Each person 10*a* and 10*b* approaches the security guard 312. The security guard 312 removes first and second security badges 102*a* and 102*b* from a tray containing multiple security badges. At this point, each security badge 102*a* and 102*b* contains no security information. Before the security badges 102*a* and 102*b* are given to the two people 10*a* and 10*b*, different encryption keys are stored in the two security badges 102*a* and 102*b*. The encryption keys (e.g., symmetric keys) will be used for secure communication with the badges 102*a* and 102*b*.

The first person 10*a* clips on the first security badge 102*a*. Once the attachment sensor and processor establish that the first badge 102*a* has been clipped onto the first person 10*a*, the first badge 102*a* informs the security control computer 316 that it is ready to is ready to receive the security information. An attribute (e.g., a fingerprint, retina, iris, voice, face) of the first person 12*a* is scanned by the biometric scanner 314. In addition or in the alternative, a form of identification is supplied to the security control computer 316 (e.g., a drivers license number, a password). The security control computer 316 retrieves security information based on the biometric and identification information, and sends the security information to the first security badge 102*a*. In this example, the security control information includes a personal identifier, a time stamp, and an access code. The first security badge 102*a* stores the security information and, therefore, assumes the persona of the first person 10*a*. A first leg of a security path is formed between the first person 10*a* and the first badge 102*a*. For as long as the first person 10*a* wears the first security badge 102*a*, the first leg of the security path is maintained.

The second person 10*b* clips on the second security badge 102. In the same manner, the second badge 102*b* receives and stores security information about the second person 10*b*. For as long as the second person 10*b* wears the second security badge 102*b*, a first leg of a security path between the second person 10*b* and the second badge 102*b* is maintained.

The two people 10*a* and 10*b* approach the room 12*a*. Both security badges 102*a* and 102*b* transmit their access codes to the smart door lock 104*a*. The access codes indicate that the first person 10*a* is authorized to enter the room 12*a* alone, but the second person 10*b* can only enter the room 12*a* if accompanied by the first person 10*a*. Based on the access codes that it receives from both badges 102*a* and 102*b*, the smart door lock 104*a* allows both people 10*a* and 10*b* to enter the room 12*a* together.

As the first person 10*a* approaches the computer 102*a*, the first badge 102*a* transmits the personal identifier and access code to the first computer 12*b*. The computer 12*b* limits the first person's access to files and other computer resources according to the personal identifier. Moreover, the computer 12*b* may personalize the graphical user interface according to the identifier.

Depending upon the security parameters, the computer 12*b* may deny access if unknown or unauthorized persons (either not having sensing devices or having such devices but not having permissions) are in the room 12*a*. For example, the second person 10*b* is not allowed to access any resources on the computer 12*b*. Therefore, the computer 12*b* makes its terminal go blank if the first person 10*a* is not facing the terminal, or if the second person 10*b* is within viewing range of the terminal. The computer 12*b* might automatically shut down if the second person 10*b* attempts to access the computer 12*b*. Or, the computer 12*b* might contact the security control computer 316, which would alert a security guard.

Later, the first person 10*a* leaves the room 12*a*, unclips the first badge 102*a*, and returns the first badge 102*a* to the security guard 312. As soon as the first badge 102*a* is unclipped, it expunges all of its security information. The first badge 10*a* becomes a clean slate, and is placed back in the tray for later use.

The second person 10*b* leaves the room 12*a* but forgets to unclip and return the second badge 10*b*. However, the second badge 102*b* has a time stamp (which was transmitted along with the personal identifier and the access code). The second badge 102*b* determines when the time stamp has expired (the badge 102*b* might have an internal clock or it might receive times from an external source). As soon as the time stamp expires, the second badge 102*b* expunges all of its security information. Therefore, the second person 10*b* cannot use the second badge 102*b* to re-enter the room 12*a* or access any other assets.

If the second person 10*b* unclips the second badge 102*b* and gives the unclipped badge 102*b* to a third party, the second badge 102*b* will detect the event and expunge all security information. Therefore, the third party cannot use the second badge 102*b* to enter the room 12*a* or access any assets.

An encryption key need not be stored in a badge before the badge is given to a person. In another exemplary security system, a person takes a badge completely empty of any identity, encryption and security information. The badge may be taken, for example, from a tray located in a lobby of a building. The badge detects that is being worn by the person, and then detects that it is in the presence of a device for performing user identification and providing security information. Once the presence of the device is detected, the badge automatically generates a unique, one-time use encryption key (the one-time encryption key is designed to prevent replay attacks). After the person has been positively identified, the badge sends the key to the device, and the device uses the key to encrypt the security information and sends the encrypted security information to the badge. At the end of the day, the person removes the badge and tosses it back into the tray. Eliminated is the need for a security guard or other person to give the badge to the person.

While wearing the badge, a person never sees or handles security information, doesn't have to interact with door-locking mechanisms, enter additional passwords into computers, etc. The security information is transmitted between the security badge, door lock mechanism, and computer. The security information is encrypted. Therefore, the security information is protected against eavesdroppers.

The uses for the security system are varied and numerous. The security system may be used in a hospital to electronically grant and deny access into certain locked rooms, or medicine cabinets. As to a location tracking application, if the security center is configured to triangulate specific sensors, the security center can exactly determine an individual's location. In a hospital, such a system could exactly determine the location of a doctor or patient.

The security system may be used for aviation security. Tokens could be attached to pilots. The first leg of the security path could be broken not only if a token is removed from a pilot, but if the token detects that the pilot is dead or incapacitated.

The security system may be used in an amusement park or ski area where all guests are given devices on a temporary (i.e., daily basis). The system could immediately identify a guest's location and whether the guest is still wearing the device.

The security system may be used to "personalize" a device. One such device is an Internet appliance. The token sends security parameters to the Internet appliance. The security parameters might indicate name, password, and a context. The Internet appliance configures itself according to the security parameters and, thereby, becomes personal to the user.

There are no limitations on the security information. The security information can be different from user to user, place to place, task to task, and instant to instant. The security information can specify who, where and when, how assets are used, and what the assets are used in conjunction with.

There is no limitation as to how a token communicates with an agent or asset. Wireless communication is but one example.

The present invention is not limited to the specific embodiments described above. Instead, the present invention is construed according to the claims that follow.

The invention claimed is:

1. A security system comprising:

a token;

the token associated with a first user while attached to the first user;

the association with the first user automatically discontinued when the token is detached from the first user;

the token associated with a second user while attached to the second user;

the association with the second user automatically discontinued when the token is detached from the second user;

whereby the token is dynamically associated with the first and second users.

2. The system of claim 1, wherein the token includes an attachment sensor for determining when the token is detached.

3. The system of claim 1, wherein the token includes a biometric sensor for obtaining identification information about the user to whom the token is attached.

4. The system of claim 1, wherein the token includes means for authenticating the user to whom the token is attached.

5. The system of claim 1, wherein the token includes:

an attachment sensor;

a processor; and data storage;

the processor storing security information in the data storage after the sensor indicates that the token has been attached to the first or second user;

the processor expunging the security information from the data storage when the sensor detects that the body has been detached from the first or second user.

6. The system of claim 1, further comprising access control means for an asset, the means not allowing access to the asset if a security path between the token, the user to whom the token is attached, and the means is not established.

7. The system of claim 6, wherein a leg of the security path is established while the token communicates at least some of the security information with the access control means.

8. The system of claim 7, wherein a leg of the security path is established while the token is attached.

9. The system of claim 1, further comprising means for accessing security information about the user to whom the token is attached, and sending the security information to the token.

10. The system of claim 9, wherein the token generates a one-time use encryption key and sends the key to the means; and wherein the means uses the key to encrypt the security information and send the encrypted security information to the token.

11. The system of claim 1, further comprising control access means for receiving at least some security information from the token; and means for receiving at least some security information from the control access means, making a control access decision, and supplying the control access decision to the control access means.

12. A security system comprising a token attachable to a user; the token associated with the user while attached to the user; the association automatically discontinued when the token is detached from the user, wherein the token includes data storage for storing security information, the security information indicating a security violation condition, and wherein the token expunges the security information when the condition is detected; whereby the association between the token and the user is discontinued when the security information is expunged.

13. Apparatus controlling a user's access to an asset, the apparatus comprising:

first means for detecting attachment and detachment of the apparatus to the user; and second means for storing information about the user's access, the information stored after the first means indicates that the apparatus has been attached;

the second means expunging the information when the first means detects that the token has been detached.

14. A device for securing a user, the device comprising:

a body securable to the user;

a sensor for detecting when the body is unsecured from the user;

a processor; and data storage;

the processor storing security information related to the user in the data storage when the sensor detects that the body is secured to the user;

the processor expunging the security information from the data storage when the sensor detects that the body has been removed from the user.

15. The device of claim 14, further comprising a biometric sensor for obtaining identification information about the user.

16. The device of claim 14, further comprising a transmitter for transmitting at least some of the security information.

17. The device of claim 16, wherein the security information is transmitted over a secure channel.

18. The device of claim 14, wherein the processor also generates a one-time use key for encryption of security information.

19. The device of claim 14, further comprising sensors for obtaining context information, the context information being evaluated against the security information.

20. The device of claim 14, further comprising a transmitter for transmitting a tracking signal.

* * * * *